INVENTORS.
JOHN HAROLD BARWELL
DONALD JAMES LANHAM
BY

*Merchant & Gould*

ATTORNEYS

United States Patent Office 3,445,889
Patented May 27, 1969

3,445,889
EXTRUDING METHODS AND APPARATUS
John Harold Barwell, Cambridge, and Donald James
Lanham, Swavesey, England, assignors to Barwell Engineering Ltd., Cambridge, England, a British company
Filed Mar. 28, 1966, Ser. No. 542,443
Claims priority, application Great Britain, June 29, 1965,
27,566/65
Int. Cl. B29f 3/06
U.S. Cl. 18—12                 15 Claims

ABSTRACT OF THE DISCLOSURE

Extruding apparatus utilizing a hydraulic cylinder having means for applying a constant predetermined pressure to said cylinder for extruding material at a constant rate and a knife mounted for rotation past the extruding nozzle so that the knife passes the nozzle at a constant predetermined repetition rate but travels faster as it passes the nozzle than at other points of the cycle.

The invention relates to extruding methods and apparatus and is particularly applicable to producing pieces of rubber and pieces of other extrudable materials so that all of the pieces are of substantially the same volume.

Articles formed from rubber are frequently formed by placing blanks, or "preforms," of compounded rubber in compression moulds which are closed between heated platens of hydraulic presses. In such a process it is preferable for all blanks presented to a given mould to be of exactly the same volume so as to eliminate or reduce to a minimum wastage of material, or the production of rejects. However it is found that many materials, such as rubber compounds, "recover" i.e. shrink in the longitudinal direction after extruding with the result that the cross-sectional area may increase by up to 100% or more of the cross-sectional area when leaving the extrusion die. This shrinking in length and increasing of the cross-sectional area may not be uniform along the length of the extrudate and thus when it is cut into pieces of equal length these pieces may be of different volumes due to these variations in the cross-sectional area. It is an object of the invention to provide a method of forming separate pieces of extrudable material which, in spite of shrinkage, are of substantially the same volume.

According to the invention a method of forming extrudable material into separate pieces of the same predetermined volume comprises extruding the material at a constant volume rate through a die and repeatedly severing the extrudate at a point where it emerges from the die, at equal time intervals. It will be appreciated that severing the extrudate at the point where it emerges from the die ensures that there is no opportunity for the material to shrink and swell upstream of the cut so that each piece of material is of a constant volume determined by the rate of extrusion in relation to the time interval between successive cuts.

In the above method hydraulic fluid may be employed for applying pressure to said material so as to force it through said die. The volume rate of extrusion may be maintained constant by metering the hydraulic fluid at a controlled volume rate. The predetermined volume of the pieces may be altered by adjusting the volume rate of extrusion, whereas the frequency of cutting is unaltered. Alternatively the preterimined volume may be altered by adjusting the time intervals between successive cuts.

It is necessary to have a reasonably fast speed of severing the extrudate because the die orifice must not be blocked by the cutter for any appreciable length of time and therefore the speed of cut should not be below a certain minimum. Thus when the time interval between successive cuts is varied it must be ensured that the actual speed of cutting does not fall below the minimum as mentioned above.

In the above method the impedance to the extrusion of material may be arranged to differ in different parts of the die, the volume rate of extrusion through those parts thereby differing in such a manner that the extrudate has differing dimensions in the direction of extrusion. In the case where the material is of a kind which "recovers" after extrusion the recovery of each severed piece may be arranged to form the piece into the required shape and to the required dimensions.

An apparatus for carrying out any of the above methods may comprise an extruder having a die shaped to extrude the material in the form of a continuous length of appropriate cross-sectional shape means for maintaining the volume rate of extrusion constant, and cutting means arranged to sweep periodically across and closely adjacent the outlet from the die so as to sever the extrudate into pieces of equal volume, at the point where it emerges from the die. Preferably means are provided for adjusting the number of cuts per minute.

The extruder may comprise an hydraulic ram the plunger of which is arranged to apply pressure to the material to be extruded and said means for maintaining the volume rate of extrusion constant may comprise valve means controlling, and maintaining substantially constant, the rate at which hydraulic fluid is supplied to the ram. When an hydraulic ram extruder is employed and the material being extruded is forced through the die by a ram, rather than, for example, a rotating screw, little energy is put into the material. Consequently little or no heat build-up occurs in the material and therefore the apparatus can produce pieces, at low temperature, from materials which are particularly heat sensitive.

In practice valve means for controlling, and maintaining substantially constant, the rate at which hydraulic fluid is supplied to the ram may depend for their effective operation upon a substantially constant pressure difference being provided across the valve means. Preferably therefore means are provided for automatically maintaining a substantially constant pressure difference across said valve means.

For example the pressure of fluid upstream of said valve means may be controlled by a fluid pressure actuated control device adapted to maintain said pressure substantially constant at a predetermined value and means responsive to the pressure difference across the aforesaid valve means may be adapted automatically to adjust said predetermined value in a manner to maintain said pressure difference substantially constant.

In any of the above forms of apparatus the cutting means may comprise a cutter movably mounted on a rotatable carrier which latter is driven so that the cutter is repeatedly moved past the face of the die and means for imparting movement to the cutter relatively to the carrier so as to cause the cutter to move past the holder at a speed greater than that of the carrier. Such an arrangement allows the frequency of cutting to be comparatively low without the actual speed of cutting at the die orifice falling below a certain minimum as referred to earlier.

In one particular arrangement the cutter is pivotally mounted on the carrier and a stationary element is arranged to engage the cutter at a location spaced away from the pivot axis of the cutter, whereby additional movement is imparted to the cutter relatively to the carrier, the stationary element being so located that said additional movement is in the same direction as the movement of the carrier and takes place whilst the cutter is passing the said holder.

Preferably adjusting means are provided for moving the carrier in an axial direction to adjust the clearance between the path of movement of the cutter and the face of the die.

In any of the forms of apparatus referred to above said die may be shaped to present different impedances to extrusion in different part of the die, so that different parts of each piece of extrudate have different dimensions in the direction of extrusion. For example different impedances may be provided by the walls of different parts of the die aperture having differing dimensions in the direction of extrusion.

A part of the die aperture may have a cross-sectional area upstream of the outlet from the aperture which is less than the cross-sectional area of the part of the die aperture at said outlet, the cross-sectional area of the outlet determining the thickness of the part of the extrudate passing through that part of the die, and said latter cross sectional area determining the impedance of that part of the die and hence determining the dimension, in the direction of extrusion, of the part of the extrudate. For example the cross-sectional area of the said part of the die aperture may increase continuously from said lesser cross-sectional area portion to said outlet.

When extruding material, such as rubber compounds, which "recover" as mentioned above it is found that, after extrusion, the portions of blanks on the upstream or trailing edge thereof, at the point where they have been severed, tend to become concave. It is found that this effect may be reduced or prevented by at least a part of the die aperture being so shaped that the cross-sectional area of at least a part of the aperture upstream of the outlet from the die aperture is smaller than the cross-sectional area at said outlet. For example the part of the die aperture may be stepped or may have a diverging tapering lead-out.

The following is a more detailed description of various embodiments of the invention, reference being made to the accompanying drawings in which.

Figure 1:
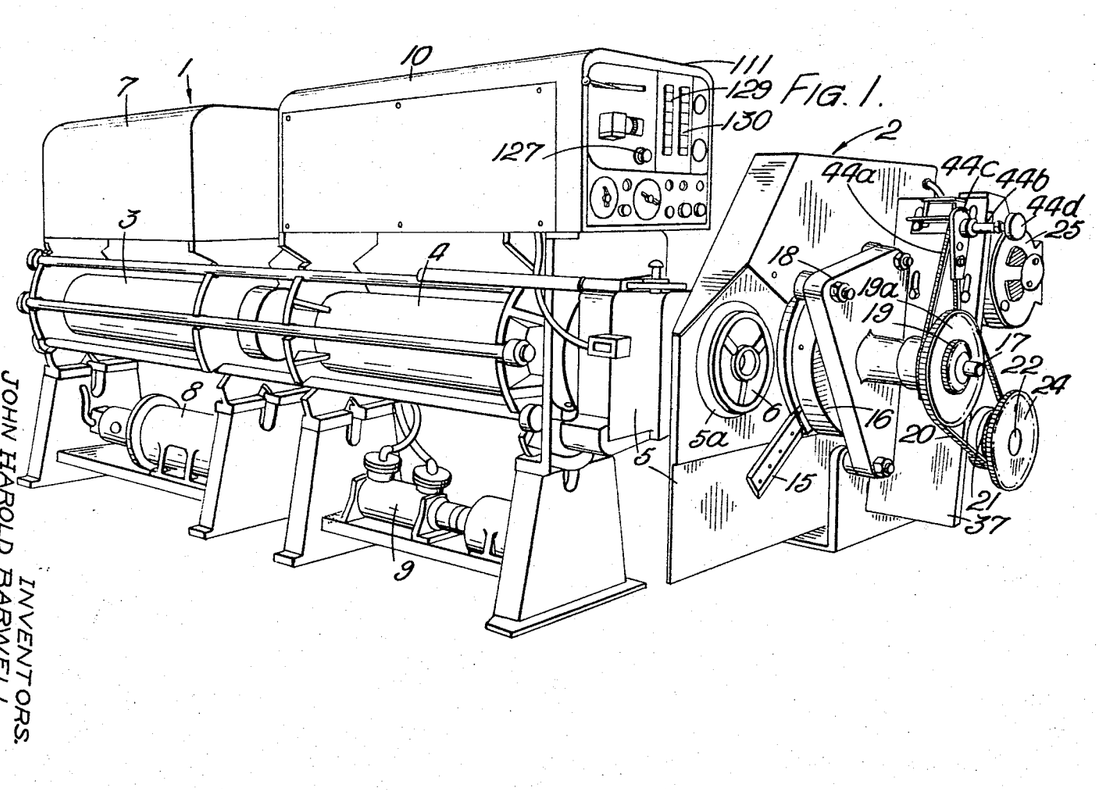
FIGURE 1 is a perspective view showing the general arrangement of one form of apparatus.

Referring to FIGURE 1: the apparatus comprises an hydraulic ram extruder, indicated generally at 1 and a cutter mechanism indicated generally at 2. The extruder comprises a ram cylinder 3 and an extruder barrel 4 to the end of which is hinged a head assembly 5 including a die holder 5a carrying an extrusion die 6. Other parts of the extruder shown in FIGURE 1 are an hydraulic tank assembly 7, an hydraulic pump 8, a vacuum pump 9, a control unit 10, and a control panel 11. The extruder is arranged, in a manner described in detail later, to extrude material at a constant volume rate through the die.

The cutter mechanism 2 comprises a cutter blade 15 which is rotatable across the face of the die 6. The cutter blade 15 is mounted, in a manner referred to later, on a flywheel 16. A shaft 17 carrying the flywheel 16 is rotatably mounted in bearings in a generally triangular plate 18 mounted on the head assembly 5 and the shaft 17 has secured thereto two sprocket wheels 19a and 19. The wheel 19a is encircled by an endless chain 20 which also encircles a sprocket wheel 21 on the output shaft 22 of a reduction gear box 23 (see FIGURE 2). Also secured to the output shaft 22 is a further sprocket wheel 24 the arrangement being such that the chain 20, instead of encircling the sprocket wheels 19a and 21 as shown, can be adjusted to encircle the sprocket wheels 19 and 24 so as to alter the speed of rotation of the flywheel 16.

Figure 2:
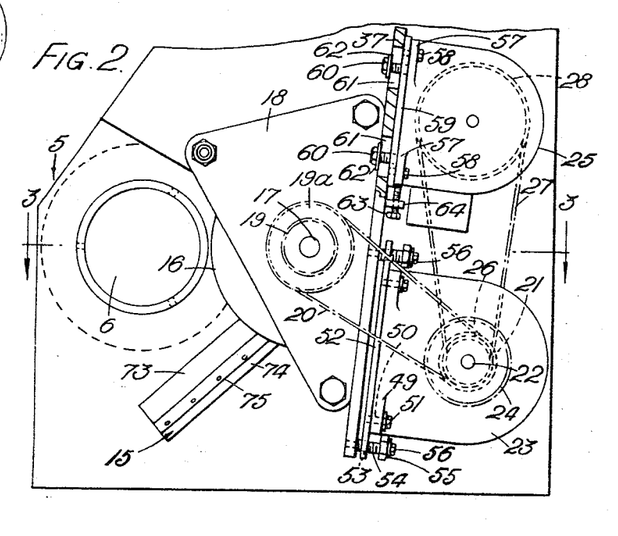
FIGURE 2 is a front elevation of the apparatus shown in FIGURE 1 showing the die holder and the mounting and drive for the rotating cutter.
Figures 3, 4:
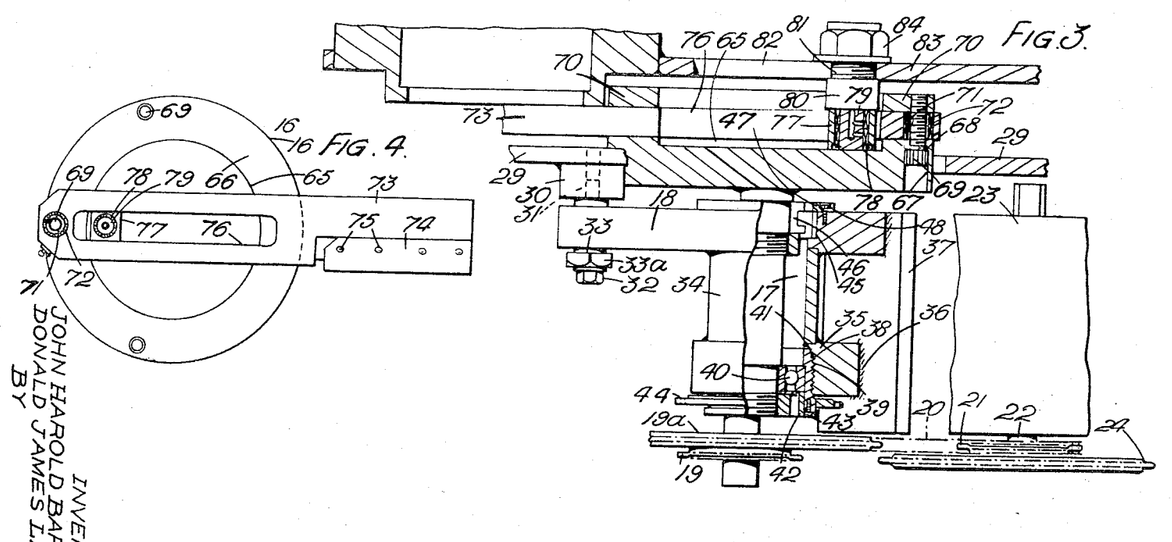
FIGURE 3 is a section on the line 3—3 of FIGURE 2.
FIGURE 4 is a rear view of the flywheel and cutter mounting.

The reduction gear box is driven by a four-speed electric motor 25, and, as best seen in FIGURES 2 and 3, the input shaft of the reduction gear box has secured thereto a toothed pulley 26 which is encircled by a toothed endless belt 27 which encircles a toothed pulley 28 on the output shaft of the electric motor 25.

Referring now to FIGURES 2 and 3 which show the mounting and drive arrangement for the cutter in greater detail: the head assembly 5 which is hingedly connected to the end of the extruder barrel 4 comprises a frame member 29 (see FIGURE 3) which has welded to it a number of bosses 30 which are formed with threaded holes 31 for receiving the threaded extremities of bolts 32. Rotatably mounted on the non-threaded shanks of the bolts are externally threaded sleeves 33 having hexagonal heads 33a. The threaded sleeves engage threaded holes in the aforementioned triangular plate 18.

A housing 34 is secured to the plate 18 and the outer end of the housing has fixed to it a collar 35 which in its turn is welded at 36 to a supporting plate 37 fixed to the plate 18.

The collar 35 is internally threaded at 38 to receive an externally threaded housing 39 for a ball bearing 40, which bearing is held against a shoulder 41 formed within the housing 39, for which purpose there is provided a ring 42 one end of which engages the bearing and the other end of which is formed with an outwardly directed flange. The flange is provided with a number of screws 43 which engage threaded holes in the bearing housing 39. The housing 39 has secured to it a sprocket wheel 44, the purpose of which will be described below.

The inner face of the plate 18 is recessed at 45 to receive a further bearing 46 which is held in position by a ring 47 secured to the plate 18 by screws 48. The aforementioned driving shaft 17 of the flywheel is supported by the bearings 40 and 46.

As mentioned above the driving shaft 17 is driven through a chain and sprocket transmission from the output shaft of a reduction gear box 23. Each end wall of the casing of the gear box 23 is provided with lugs 49 (see FIGURE 2) formed with holes 50 through which extend screws 51 which engage threaded holes in a base plate 52. The base plate is provided with further threaded holes 53 which are engaged by externally threaded bushes 54 having hexagonal heads 55. The other ends of the bushes abut the aforesaid supporting plate 37 which is welded to the triangular plate 18 at right angles thereto, and the threaded shanks of screws 56 pass through the bushes 54 and engage threaded holes in the support plate 37. Thus by rotatably adjusting the bushes 54 the distance of the gear box 23 from the supporting plate 37 may be varied.

The casing of the motor 25 is similarly provided with lugs 57 having holes therein through which extend screws 58 which engaged threaded holes in a base plate 59. The base plate 59 is secured to the supporting plate 37 by screws 60 which extend through slots 61 in the supporting plate 37 and engage threaded holes in the base plate 59. The screws are encircled by washers 62 beneath the heads of the screws the washers overlying the sides of the slots 61. Thus by loosening the screws 60 the motor 25 may be adjusted towards or away from the gear box 23. This movement may be effected by an adjusting screw 63 which engages a threaded hole in a lug 64 welded to the supporting plate 37, the end of the adjusting screw 63 abutting against one of the lugs 57 on the motor casing.

Referring now to the flywheel and cutter arrangement shown in FIGURES 3 and 4: the inner face of the flywheel is formed with a circular recess 65 so as to provide an axially projecting rim 66. The rim 66 is provided with a number of stepped axially extending holes 67 there being a shoulder 68 between the two parts of each hole. Screws 69 extend through each hole with their heads abutting the shoulder 68 and the threaded ends of the screws 69 engage threaded holes in a retaining ring 70. The retaining ring 70 is spaced from the rim 66 of the flywheel by sleeves 71 encircling the screws 69.

One of the sleeves 71 is encircled by a needle bearing 72 mounted in a hole in an elongated cutter holder 73. The spacing between the retaining ring 70 and the rim 66 of the flywheel, maintained by the sleeves 71, is such as to permit the cutter holder 73 to pivot freely. A cutter blade 74 is secured to the cutter holder 73 by screws 75. The cutter holder 73 is provided with a straight slot 76 along a part of its length and slidable within the slot is a block 77 which also projects into the recess 65 in the flywheel. The block 77 is mounted, by means of a needle bearing 78, on the reduced extremity 79 of a fulcrum pin 80. The fulcrum pin 80 has a threaded portion 81 which passes through a slot 82 in a plate 83 comprising part of the head assembly 5. A nut 84 clamps the pin 80 to the plate 83. The position of the fulcrum pin 80 may thus be adjusted in relation to the axis of rotation of the flywheel by loosening the nut 84 and sliding the pin along the slot 82.

With the arrangement shown, as the flywheel 16 rotates carrying with it the cutter holder 73, there is relative movement between the slot 76 in the cutter holder and the block 77 and the arrangement is such that additional swinging movement is imparted to the cutter holder in the direction of rotation of the flywheel as the cutter blade 74 is sweeping across the face of the die 6. The extent of the additional movement will depend on the position to which the block 77 has been adjusted.

By adjusting the position of the threaded bushes 33 in the plate 18 the axis of rotation of the flywheel may be arranged to be accurately at right angles to the face of the die and since the cutter blade is pivoted on the flywheel the plane in which the cutter swings may be brought parallel to the face of the die. By rotation of the sprocket wheel 44 the cutter can be adjusted towards and away from the outer face of the die. As best seen in FIGURE 1, the sprocket wheel 44 is encircled by a chain 44a which also encircles a sprocket wheel on a shaft 44b which is rotatable in a structure 44c secured to the plate 37. The shaft 44b is provided with a manipulating knob 44d so that the sprocket 44 may be rotated by rotating the knob 44d. A frictional device is provided between the shaft 44b and structure 44c to prevent the shaft 44b from rotating owing, for example, to vibration.

The apparatus operates generally as follows: the ram piston having been retracted in a manner to be described, the head assembly 5 is swung away from the end of the extruder barrel 14 and the latter is charged with rolls of rubber compound which has been heated to render it extrudable. The head assembly 5 is then swung and clamped into the operating position shown in FIGURE 1. The extruder ram is then rapidly extended to take up "slack" in the extruder barrel and until the rubber just begins to emerge from the die. During this operation the vacuum pump 9 is operated to evacuate air from the extruder barrel. The motor 25 is then started, the required speed having been pre-set and the control valve for the extruder is also operated, the required volume rate of extrusion having been preselected. As the extrudate emerges from the die 6 it is severed, at the die face, by the cutter into separate blanks or preforms. As will be described below the extruder is arranged to extrude the rubber at a constant volume rate so that each blank or preform is of the same volume. The volume rate of extrusion of the extruder is adjusted to give a required volume per blank for a given cutter speed and a reference chart may be prepared from which the volume of the blanks can be read off for each particular combination of extruder setting and cutter speed.

The transmission for rotating the flywheel may embody a counter which may be set to actuate a cut-out mechanism for stopping the extruder after a predetermined number of blanks have been severed. The cut-out mechanism preferably also is arranged to stop the motor 25 driving the cutter.

As mentioned earlier the leading edge of the cutter blade 74 is parallel to the face of the die 6 but the blade is also inclined to the face of the die. The rate of rotation of the cutter blade is so selected in relation to the extrusion rate that as the cutter blade sweeps past a given point on the die, the underface of the blade, due to its inclination, recedes from the face of the die at a rate not less than the rate at which the extrudate emerges from the die. Thus the end of that part of the extrudate which has just been cut is not rubbed by the part of the blade behind the cutting edge as the blade sweeps over the end of the extrudate.

The above arrangement, in which the cutter blade is pivotally mounted on the flywheel so as to sweep across the face of the die at a greater speed than the speed it would have due to the rotation of the flywheel alone, enables a fast speed of cut to be obtained without the interval between successive cuts being unduly short. Although the arrangement shown is the preferred one, in an alternative arrangement, not shown, a similar effect may be achieved by the path of movement of the cutter being adjustable between a position where it sweeps across the die orifice and a position where it is clear of the die orifice. The path of movement may then be adjusted periodically between said positions in such a manner that the cutter blade sweeps across the die orifice, severing the extruded material, only once during every two or more sweeps of the cutter so that the interval between successive cuts is a multiple of the interval between successive sweeps of the cutter. With this arrangement the speed of movement of the cutter across the face of the die may be increased without necessarily reducing the period between successive cuts.

Figures 5, 6:
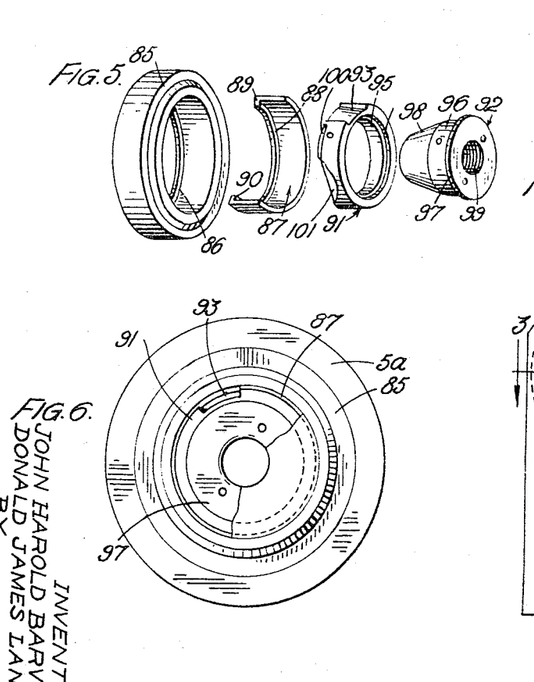
FIGURE 5 is an exploded view of one form of die and its holder which die is suitable for extruding blanks for the manufacture of combined soles and heels for shoes.
FIGURE 6 is a face view of the die shown in FIGURE 5, when assembled.
Figures 7, 8, 9, 10:
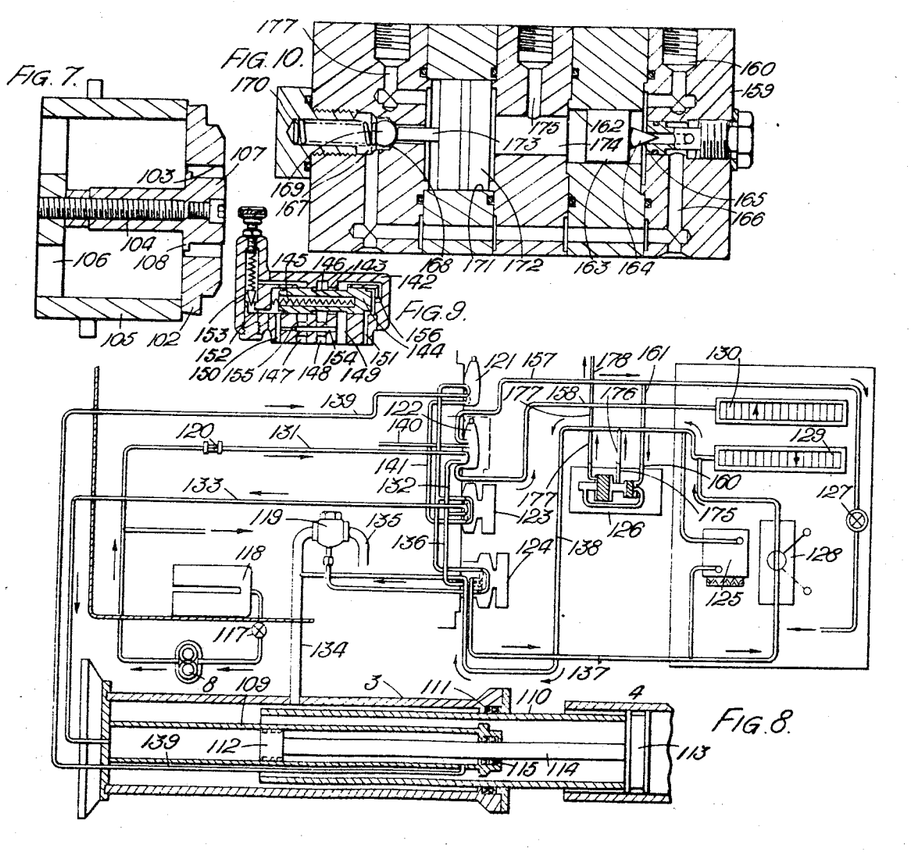
FIGURE 7 is a section through a further form of die.
FIGURE 8 is a diagrammatic drawing of the extruder ram of the apparatus shown in FIGURE 1, and its associated hydraulic control circuit.
FIGURES 9 and 10 are sections through two of the valves incorporated in the control circuit of FIGURE 8.

FIGURES 5 and 6 show one form of die suitable for use in the apparatus, and FIGURE 7 shows another form of die.

The die shown in FIGURES 5 and 6 is suitable for the production of blanks or preforms from which may be moulded a sole and heel of a shoe. A die holder in the head assembly 5 is arranged to accommodate an outer die ring 85 having a stepped bore providing a shoulder 86. The outer die ring accommodates a mandrel die comprising an arcuate element 87, a shape ring 91 and a mandrel 92. The arcuate element 87 is formed with a shoulder 88 which is arranged to abut the shoulder 86 when the element 87 lies within the outer die ring. The arcuate gap between the ends 89 and 90 of the element 87 corresponds in length to the combined lengths of the sole and heel portions of the blank to be extruded through the die. The shape ring 91 is formed in its outer surface with an axially extending groove 93 which corresponds to the heel portion of the blank to be extruded. The outer end face of the shape ring 91 is recessed at 94 and the internal peripheral face 95 of the shape ring is cylindrical. This peripheral face accommodates an external circumferential face 96 of the mandrel 92 and the mandrel is provided with a radial end flange 97 which fits snugly within the recess 94 in the shape ring 91. The part of the mandrel 92 beyond the circumferential face 96 is tapered at 98 which tapered portion projects through the other parts of the die and forms a lead-in for the extrudate. The mandrel die comprising the arcuate element 87, shape ring 91 and mandrel 92, is clamped together by screws passing through registering radial holes in those parts. The mandrel 92 is formed with a central threaded bore 99 which is in threaded engagement with a spider (not shown) which is on the upstream side of the die holder in the head assembly 5 and is formed with a central threaded boss onto which the threaded bore 99 may be screwed to locate and secure the die in position.

The depth of the heel-portion-forming slot 93 on the outer surface of the shape ring 91 increases as it extends downstream. Also the part of the outer surface of the shape ring forming the sole portion of the extrudate is chamfered at 100 and is provided with an arcuate step at 101. The object of this shaping of the outer face of the shape ring 91 is to vary the impedance to extrusion of the die at different points around the arcuate die aperture so as to give the required shape to the blank. The impedance of a die aperture is a function of the minimum cross-sectional area of the aperture and the length of the "land," i.e. the dimension of the boundary wall of the die aperture in the direction of extrusion. Thus the length of the land opposite the step 101 on the shape ring 91 is less than the length of the land opposite the chamfer 100. There is thus less impedance to extrusion at the location of the step 101 and thus a greater volume of material will be extruded at this part of the aperture than at the part opposite the chamfer 100. Since the depth of the aperture opposite both the chamfer 100 and the step 101 is the same, it follows that the length of the extruded material in each blank will be greater opposite the step 101. Since this is the part of the blank which will form the sole portion of the shoe this sole portion will be wider than the "instep" portion which emerges from the part of the die opposite the chamber 100. Thus the finished blank will conform approximately to the shape of a finished sole.

The downstream end of the "trumpet" shaped groove 93 has a depth appropriate to the thickness required for the heel portion of the blank (it will in fact be less than the required thickness to allow for the aforementioned swelling), but if the groove were of this depth along the whole of its length the impedance of this part of the die aperture would be less than the impedance along the other parts of the die aperture and thus the heel portion of the finished blank would be excessively wide. Thus the groove 93 is trumpet shaped so that at its upstream end its depth is such as to given an impedance which results in the heel portion of the blank being of the required width. It is important that the angle of inclination of the bottom of the groove 93 is not so great that the extrudate does not engage the bottom surface, since if the extrudate in emerging from the die does not engage this bottom surface of the groove, the effective impedance of this portion of the die is reduced and the heel portion of the blank will be too wide as well as being too thin.

Thus when a portion of the extrudate is projecting from the die and at the instant when the portion is just about to be severed from the die by the cutter blade, the dimensions of the portion in the direction of extrusion vary from the heel to the toe part of the portion in a manner corresponding to the required variations in width along the length of the blank eventually to be formed. Thus when the cutter has severed the portion of extrudate from the face of the die the trailing or upstream edge of the severed portion is straight. However, as mentioned earlier rubber shrinks or "recovers" when cooling after extrusion and the effect of this on a blank of the kind just described is to deform the initially straight trailing edge of the severed portion so as to render the blank approximately symmetrical about an axis extending from the heel to the toe portion. After this recovery the blank has approximately the shape of a combined heel and sole of a shoe. Thus when the blank is placed in a mould for forming a combined heel and sole there is very little wastage of material due to the blank closely approximating the finished shape.

Due to the above-mentioned shrinkage or "recovery" of rubber after extrusion it is found that the portions of blanks on the upstream or trailing edge thereof, at the point where they have been severed, tend to become concave. Thus in the case of a circular cross-section piece of extrudate one end face of the piece becomes dished, and in the case of a piece of annular cross-section one end face becomes formed with an annular depression or groove. As mentioned earlier it is found that this effect may be reduced or prevented by forming the die aperture with a step upstream of the outlet, and FIGURE 7 shows a die having this feature. The die shown in FIGURE 7 is suitable for extruding annular sections and comprises a die ring 102 formed with a circular cross-section bore 103, and a mandrel 104 mounted within a cup-like spider 105 the end wall of which is formed with apertures 106 to permit the passage of extrudate. The mandrel 104 is formed with an enlarged head 107 which is disposed within the bore 103 so as to form an annular die aperture. At the upstream end of the annular aperture the head 107 is formed with a radially extending peripheral flange 108 which reduces the effective cross-sectional area of the die aperture at the upstream end thereof. As the extrudate emerges from the die it is cut by the cutter to form rings but the rings recover and shrink axially as they cool, as mentioned earlier, and there is an increase in their wall thickness. The dimensions of the flange 108 are such that the cross-sectional area of the annular passage between the flange and the bore 103 is approximately 55% of the cross-sectional area of the annular passage between the main part of the head 107 and the bore 103. It is found that by using a die of the kind shown in FIGURE 7 in which the effective aperture dimension is reduced at a point along its length reduces, or prevents completely, the above-mentioned concavity formed on the blanks after severing. It will be appreciated that the flange may project inwardly from the outer die ring 102, and this would also be the case where a solid circular cross-section blank was being produced, rather than an annulus.

FIGURE 8 shows diagrammatically the hydraulic ram extruder part of the apparatus and the hydraulic circuit by means of which it is controlled to give a constant volume rate of extrusion. In this figure the ram cylinder is indicated at 3 and the extruder barrel is indicated at 4. Disposed co-axially within the main ram cylinder 4 is an inner cylinder 109. The ram piston assembly comprises an outer cylindrical piston member 110 which passes in a fluid-tight manner through a gland 111 at the end of the main ram cylinder 3, and an inner piston 112 which is reciprocable within the inner cylinder 109. A piston head 113 reciprocable within the extruder barrel 14 is mounted on the end of the piston member 110 and a piston rod 114 connects the piston head 113 to the piston 112, the piston rod 114 passing in a fluid-tight manner through a gland 115 at the end of the inner cylinder 109.

The control circuit for the ram comprises the aforementioned hydraulic pump 8 for delivering hydraulic fluid from a reservoir through an input valve 117. Oil filters 118 are disposed between the reservoir and the valve 117. The hydraulic fluid reservoir will be hereinafter referred to as "tank." The hydraulic circuit also comprises a piston operated non-return valve 119; a check valve 120; relief valves 121 and 122; manually operable control valves 123 and 124; a manually settable volume control valve 125; an automatic pressure control valve assembly 126; a hand operated pressure control valve 127; a hand operated cut-off valve 128 in parallel with the volume control valve 125; and pressure gauges 129 and 130. The operation of all these components will become apparent in the following description of the method of operation of the extruder.

As mentioned earlier, with the ram piston assembly 110, 112, 113, 114 retracted, the extruder barrel 4 is loaded with rolls of rubber which have been heated ready for extrusion, for example by a period in a warming chamber. The valves 121, 122 and 123 have the conduits leading to them connected in the manner shown in full line in FIGURE 8, but the hand controlled valve 124 is adjusted to the position in which the conduits leading to it are connected in the manner shown dotted in FIGURE 8. The pump 8 is then started so that hydraulic fluid under pressure is delivered via the conduit 131, the valve 122, the conduit 132 and conduit 133 to the left-hand end of the inner cylinder 109. The ram therefore extends rapidly to engage the rolls of rubber in the extruder barrel 4, hydraulic fluid flowing into the main ram cylinder 3 through the conduit 134.

As the piston 112 moves along the inner cylinder 109, fluid displaced from the right-hand end of the cylinder 109 passes along the conduit 139 to the valve 121 and thence to tank via the conduit 140.

At the same time as the hydraulic pump 8 is started to extend the ram the vacuum pump 9 shown in FIGURE 1 is also started. This vacuum pump communicates with the extruder barrel 4 and evacuates trapped air from the extruder barrel.

When the "slack" in the system has been taken up by rapid extension of the ram and the extruding proper is to begin, the valve 124 is adjusted so that the conduits leading to it are connected in the manner shown in solid line in FIGURE 8. With the valve in this position fluid under pressure from the hydraulic pump 8 passes to the inner ram cylinder 109 in the same manner as before, but fluid under pressure is also passed to the main ram cylinder 3. Fluid to the main ram cylinder 3 passes from the conduit 132 and conduit 136 to the valve 124, and thence via the conduit 137 through the volume control valve 125 (which has been previously pre-set to the required volume rate at which the hydraulic fluid is to be passed to the main ram cylinder) and after passing through the volume control valve 125 the fluid under pressure passes along the conduit 138 which is in communication with the conduit 134 leading to the main ram cylinder. The control valve 128 is provided so that if required the volume control valve 125 can be by-passed should it be required to perform an operation where accurate control of the volume rate of extrusion is not important.

When extrusion is completed and it is required to retract the ram, valves 123 and 124 are operated so as to connect in the dotted line position the conduits communicating with them. In this position of the two valves, the hydraulic pump 8 delivers fluid under pressure through the conduits 131, 132 to the valve 123, and thence via the conduit 141 to the valve 121. The valve 121 is actuated by the fluid pressure to connect the conduit 141 (in the dotted line position shown in FIGURE 8) to the conduit 139 leading to the right-hand end of the inner cylinder 109. The right-hand end of the inner cylinder 109 is thus pressurised and the piston 112 is moved to the left to retract the ram. Fluid displaced from the left-hand of the inner cylinder 109 passes along the conduit 133 to the valve 123 and thence to the conduit 140 leading to tank. Fluid displaced from the left-hand side of the main ram cylinder 3 passes along the conduit 134 through the non-return valve 119 to the conduit 135 leading to tank.

The volume control valve 125 is of a known kind and is arranged to maintain constant the rate of flow of hydraulic fluid to the ram cylinder, so that the volume rate of extrusion from the extruder barrel 4 is also maintained constant. However, such a volume control valve, to operate effectively, must operate under a substantially constant pressure difference and the purpose of the automatic control valve assembly, in association with the valve 122, is to maintain the pressure difference across the volume control valve 125 substantially constant.

Referring now to FIGURE 9, this shows the valve 122 in section. The valve comprises a valve body 142 formed with a cylindrical bore 143 within which is reciprocable a spool 144. The spool 144 is biassed to the right-hand end of the bore by a spring 145, and is formed with a reduced cross-section portion 146. The valve block 142 is formed with passages 147, 148 and 149 communicating with the bore 143, and passages 150 and 151 communicating with the left and right-hand ends of the bore respectively. There is provided a passage 152 controlled by an adjustable pressure operated valve 153 and connecting the left-hand end of the bore 143 with the passage 147. A cross-passage 154 formed with a restrictor jet 155 connects the passage 150 with the passage 149, and a passage 156 connects the passage 149 with the right-hand end of the bore 143. The passage 147 is in communication with the conduit 140 (see FIGURE 8) leading to tank. The passage 148 is in communication with the conduit 131 and the passage 149 is in communication with the conduit 132. The passage 150 is in communication with the conduit 157 and the passage 151 is in communication with the conduit 158 leading to the pressure gauge 130. The purpose of the valve 122 shown in FIGURE 9 is to maintain substantially constant the pressure of the fluid which passes through the valve from the hydraulic pump 8 to the ram. Normally fluid flowing under pressure into the passage 148 from the conduit 131 passes around the reduced portion 146 of the spool and out through the passage 149 leading to the conduit 132. If, however, the pressure in the passage 148 should rise above a certain predetermined value this pressure, which is communicated to the right-hand end of the bore 143 by the passage 156 urges the spool 144 to the left, so that the passage 148 is placed into communication with the passage 147. A proportion of the fluid under pressure is therefore by-passed to tank via the passage 147 and the pressure in the passage 148 drops to the predetermined value.

The predetermined pressure referred to above can be pre-set by adjusting the valve 153. Fluid under pressure in the passage 148, 149 passes along the passage 154, through the restrictor 155, and thence through the passage 152 and 147 to tank. By opening the valve 153 the rate at which fluid is bled to the fluid reservoir may be increased so that there is a drop in pressure at the left-hand end of the spool 144. The spool consequently adjusts its position to the left, thus altering the pressure at which the above mentioned by-passing of fluid to the fluid reservoir takes place. Since, as mentioned above, the passage 150 is connected, by the conduit 157, to the hand-operated control valve 127 and to tank, the rate at which fluid is bled to tank from the left-hand of the bore 143 may also be controlled by adjusting the control valve 127.

The automatic control valve assembly 126 co-operates with the valve 122, in a manner now to be described, in order to maintain a constant pressure difference across the volume control valve 125.

Referring to FIGURE 10 the valve assembly 126 comprises a valve block 159 comprising a number of parts secured together. There is provided in the valve block 159 a passage 160 which is in communication with the conduit 157 via the conduit 161 (see in FIGURE 8).

The passage 160 communicates with a cylindrical bore 162 within which is slidable a piston member 163. One end of the piston member 163 is integrally formed with a conical projection 164 which co-operates with a port 165 which is in communication, via a passage 166, with a chamber 167 in the valve block. An outlet 168 from the chamber 167 is controlled by a ball valve 169 which is urged by a spring 170 into fluid-tight engagement with the outlet. The outlet 168 communicates with a further cylindrical bore 171 in the valve block and reciprocable in the bore 171 is a further piston member 172 formed with a push-rod 173 which is engageable with the ball 169. A passage 174 connects the two bores 171 and 162 and leading from the passage 174 is a passage 175 which is connected by a conduit 176 to the aforementioned conduits 138 (see FIGURE 8). A passage 177 leads from the left-hand end of the bore 171 and is connected by a conduit 178 to tank.

Thus the passage 174 is in communication, via the conduits 176, 138 and 134, with the ram cylinder and thus the pressure applied to the left-hand side of the piston member 163 will be equal to the ram cylinder pressure, which is in turn equal to the pressure on the downstream side of the volume control valve 125. The right-hand side of the piston member 163 is in communication, via the passages 160, 161 and 157, with the passage 150 in the valve 122. Due to the differential effective area on the two sides of the piston member 163, due to the conical projection 164 engaging the aperture 165, the piston member 163 will be biased to the right and will close the outlet 165 at a predetermined pressure difference between the two sides of the piston member 163.

The pressure in the passage 150 in the valve 122, and hence the pressure in the passage 157 and on the right-hand side of the piston member 163, is dependent on the pressure on the upstream side of the volume control valve 125. The pressure difference between the two sides of the piston member 163 therefore corresponds to the pressure difference across the volume control valve 125. Thus should there be an increase in the pressure difference across the volume control valve, the corresponding change in the pressure differential between the two sides of the piston member 163 will move the piston member 163 to the left thus permitting fluid to bleed from the passage 150 via the passages 157, 161, 160, 166, 177 and 178 (the ball valve 169 having been opened in a manner to be referred to later). This bleeding of fluid from the passage 150 has the same effect as if the valve 153 in the valve 122 had been opened so that, as described above, the pressure at the left-hand end of the spool 144 falls so that the spool moves leftwardly causing fluid to be by-passed from the passage 148 to the passage 147 leading to tank, so that the pressure on the upstream side of the volume control valve 125 drops to restore the required pressure difference across the control valve. When the correct pressure difference has been restored, the piston member 163 is moved, by the pressure difference, to its right-hand limit in which it closes the outlet 165 and cuts off the bleed of fluid from the left hand end of the spool 144 in the valve 122.

The purpose of the ball valve 169 is to prevent there being a bleed of fluid to tank when the piston member 163 lies away from the outlet 165 due to there being negligible pressure in the ram cylinder and hence in the passage 174. Thus it is only when there is sufficient pressure in the passage 174 to move the piston member 172 to the left, against the action of the spring 170, that the ball valve 169 is moved away from its seat 168 and the bleed of fluid to tank through the passages 166, 177 is permitted.

With the arrangement shown the pressure difference across the volume control valve is maintained substantially constant and hence the rate of fluid delivery to the ram is maintained substantially constant. This results in the volume rate of extrusion being maintained substantially constant.

We claim:

1. An apparatus for forming extrudable material into separate pieces of the same predetermined volume comprising an extruder having a die shaped to extrude the material in the form of a continuous length of appropriate cross-sectional shape, a hydraulic ram the plunger of which is arranged to apply pressure to the material to be extruded, means for applying hydraulic pressure fluid to the ram for operation thereof, valve means for controlling the rate at which the hydraulic fluid is supplied to the ram, means for automatically maintaining a substantially constant pressure difference in the hydraulic fluid across said valve means whereby fluid is supplied at a substantially constant rate to the ram and cutting means arranged to sweep periodically across and closely adjacent the outlet from the die so as to sever the extrudate into pieces of equal volume at the point where it emerges from the die.

2. An apparatus according to claim 1 wherein means are provided for adjusting the number of cuts per minute.

3. An apparatus according to claim 1 wherein the pressure of fluid upstream of said valve means is controlled by a fluid pressure actuated control device which maintains said pressure substantially constant at a predetermined value, and wherein means responsive to the pressure difference across the aforesaid valve means are adapted automatically to adjust said predetermined value in a manner to maintain said pressure difference substantionally constant.

4. An apparatus according to claim 1 wherein the cutting means comprise a cutter movably mounted on a rotatable carrier which latter is driven so that the cutter is repeatedly moved past the face of the die, and means for imparting movement to the cutter relatively to the carrier so as to cause the cutter to move past the die at a speed greater than that of the carrier.

5. An apparatus according to claim 4 wherein the cutter is pivotally mounted on the carrier and a stationary element is arranged to engage the cutter at a location spaced away from the pivot axis of the cutter whereby additional movement is imparted to the cutter relatively to the carrier the stationary element being so located that said additional movement is in the same direction as the movement of the carrier and takes place whilst the cutter is passing the said holder.

6. An apparatus according to claim 5 wherein the stationary element is adjustable in position towards and away from said pivot axis whereby the speed of said additional movement is varied.

7. An apparatus according to claim 6 wherein the stationary element is so disposed on a fixed part of the apparatus that when the cutter is passing the die face the distance between the stationary element and pivot axis of the cutter is less than the distance between the pivot axis of the cutter and the axis of rotation of the carrier.

8. An apparatus according to claim 5 wherein the stationary element is in permanent, longitudinally sliding engagement with the cutter, means being provided to permit the cutter to rotate about the stationary element.

9. An apparatus according to claim 4 wherein adjusting means are provided for moving the carrier in an axial direction to adjust the clearance between the path of movement of the cutter and the face of the die.

10. Apparatus according to claim 4 wherein said carrier comprises a flywheel and wherein the cutter extends outwardly from the periphery of the flywheel.

11. An apparatus according to claim 1 wherein said die presents different impedances to extrusion in different parts of the die so that different parts of each piece of extrudate have different dimensions in the direction of extrusion.

12. An apparatus according to claim 11 wherein said difference impedances are provided by the walls of different parts of the die aperture having differing dimensions in the direction of extrusion.

13. An apparatus according to claim 11 wherein a part of the die aperture has a cross-sectional area upstream of the outlet from the aperture which is less than the cross-sectional area of the part of the die aperture at said outlet, the cross-sectional area of the outlet determining the thickness of the part of the extrudate passing through that part of the die, and said lesser cross-sectional area determining the impedance of that part of the die and hence determining the dimension, in the direction of extrusion, of the part of the extrudate.

14. An apparatus according to claim 13 wherein the cross-sectional area of said part of the die aperture increases continuously from said lesser cross-sectional area portion to said outlet.

15. An apparatus according to claim 1 wherein at least a part of the die aperture is so shaped that the cross-sectional area of at least a part of the aperture upstream of the outlet from the die aperture is smaller than the cross-sectional area of said outlet.

References Cited

UNITED STATES PATENTS

| | | |
|---|---|---|
| 1,700,208 | 1/1929 | Paisseau. |
| 2,053,030 | 9/1936 | Hall _______________ 83—593 |
| 2,383,989 | 9/1945 | Pilcher _____________ 18—12 X |
| 2,466,587 | 4/1949 | Genovese ____________ 18—12 |
| 2,477,170 | 7/1949 | Broderson et al ______ 18—12 X |
| 2,537,977 | 1/1951 | Dulmage ___________ 18—12 X |
| 2,566,854 | 9/1951 | Rhodes. |
| 2,614,290 | 10/1952 | Street _____________ 18—12 |
| 2,747,224 | 5/1956 | Koch et al. |
| 2,916,792 | 12/1959 | Crook et al. _________ 18—2 X |
| 3,002,615 | 10/1961 | Lemelson __________ 18—12 X |
| 3,111,707 | 11/1963 | Buckley. |
| 3,143,766 | 8/1964 | Rohn _______________ 18—12 |
| 3,175,247 | 3/1965 | Morrison et al. _____ 18—12 X |
| 3,184,788 | 5/1965 | Serrno _____________ 18—2 |
| 3,267,518 | 8/1966 | Juel et al. __________ 18—12 |

FOREIGN PATENTS

| | | |
|---|---|---|
| 1,357,887 | 3/1964 | France. |
| 875,441 | 8/1961 | Great Britain. |

WILLIAM J. STEPHENSON, *Primary Examiner.*

UNITED STATES PATENT OFFICE
CERTIFICATE OF CORRECTION

Patent No. 3,445,889                              May 27, 1969

John Harold Barwell et al.

It is certified that error appears in the above identified patent and that said Letters Patent are hereby corrected as shown below:

In the heading to the printed specification, lines 7 and 8, "June 29, 1965, 27,566/65" should read -- April 5, 1965, 14,367/65; June 29, 1965, 27,566/65 --.

Signed and sealed this 30th day of September 1969.

(SEAL)
Attest:

Edward M. Fletcher, Jr.                         WILLIAM E. SCHUYLER, JR.
Attesting Officer                                 Commissioner of Patents